United States Patent
Morrison et al.

(10) Patent No.: US 8,493,068 B2
(45) Date of Patent: Jul. 23, 2013

(54) TOW ASSEMBLY FOR FIXED WING AIRCRAFT FOR GEOPHYSICAL SURVEYING

(75) Inventors: Edward Beverly Morrison, King City (CA); Elton Townsend, Gravenhurst (CA)

(73) Assignee: Geotech Airborne Limited, St. Michael (BB)

( * ) Notice: Subject to any disclaimer, the term of this patent is extended or adjusted under 35 U.S.C. 154(b) by 148 days.

(21) Appl. No.: 12/910,386

(22) Filed: Oct. 22, 2010

(65) Prior Publication Data

US 2011/0115489 A1     May 19, 2011

Related U.S. Application Data

(60) Provisional application No. 61/254,451, filed on Oct. 23, 2009.

(51) Int. Cl.
*G01V 3/16* (2006.01)
*G01V 3/165* (2006.01)

(52) U.S. Cl.
CPC ...................... *G01V 3/165* (2013.01)
USPC ........................................ 324/330

(58) Field of Classification Search
None
See application file for complete search history.

(56) References Cited

U.S. PATENT DOCUMENTS

| | | | |
|---|---|---|---|
| 3,441,841 A * | 4/1969 | Salvi et al. | 324/244 |
| 3,663,953 A * | 5/1972 | Salvi | 361/170 |
| 3,872,375 A | 3/1975 | Ronka | |
| 4,628,266 A * | 12/1986 | Dzwinel | 324/330 |
| 6,056,236 A * | 5/2000 | Weimer et al. | 244/1 TD |
| 6,244,534 B1 | 6/2001 | Klinkert | |
| 6,765,383 B1 | 7/2004 | Barringer | |
| 6,876,202 B2 | 4/2005 | Morrison et al. | |
| 7,002,349 B2 | 2/2006 | Barringer | |
| 7,157,914 B2 | 1/2007 | Morrison et al. | |
| 2005/0001622 A1 | 1/2005 | Morrison et al. | |
| 2007/0019504 A1 | 1/2007 | Howlid et al. | |
| 2009/0278540 A1 | 11/2009 | Kuzmin et al. | |

FOREIGN PATENT DOCUMENTS

| | | |
|---|---|---|
| WO | 2008130402 A2 | 10/2008 |
| WO | 2009105873 A1 | 9/2009 |

OTHER PUBLICATIONS

International Search Report issued on Jan. 17, 2011 in corresponding to International Application No. PCT/CA2010/001655 (PCT/ISA/237; 210; & 220).

* cited by examiner

*Primary Examiner* — Paresh Patel
(74) *Attorney, Agent, or Firm* — Novak Druce Connolly Bove + Quigg LLP

(57) ABSTRACT

A airborne geophysical electromagnetic (EM) survey tow assembly system for use with a fixed wing aircraft, including receiver coil assembly comprising a substantially rigid tubular receiver coil frame forming a continuous internal passageway that extends around a central open area, and a receiver coil housed within the internal passageway; a winch system having a tow cable secured to the receiver coil assembly for extending the receiver coil assembly into a survey position; and a latch system for mounting to an underside of the aircraft having releasable latch members for engaging the receiver coil assembly when the receiver coil assembly is in a retracted position.

20 Claims, 11 Drawing Sheets

TOW ASSEMBLY FOR FIXED WING AIRCRAFT FOR GEOPHYSICAL SURVEYING

CROSS-REFERENCE TO RELATED APPLICATION

This application claims the benefit of and priority to U.S. Provisional Patent Application No. 61/254,451 filed Oct. 23, 2009 under the title TOW ASSEMBLY FOR FIXED WING AIRCRAFT FOR GEOPHYSICAL SURVEYING.

The content of the above patent application is hereby expressly incorporated by reference into the detailed description hereof.

FIELD

This description relates to a receiver coil tow assembly system for use with a fixed wing aircraft for geophysical surveying.

BACKGROUND OF THE INVENTION

Geophysical electromagnetic ("EM") prospecting techniques can be effective in determining the electrical conductivity of soils, rocks, and other bodies at and under the earth's surface.

Geophysical EM prospecting can be carried out using surface based equipment and airborne equipment. Airborne methods in which equipment is transported by aircraft such as helicopter, airplane or airship may be useful for large area surveys. For airborne electromagnetic ("AEM") systems, survey data may be acquired while an airplane or helicopter flies at a nearly constant speed along nearly-parallel and close to equally-spaced lines at an approximately constant height above ground.

Some geophysical surveying methods are active in that the equipment is used to transmit a signal to a targeted area, and then measure a response to the transmitted signal. Other geophysical surveying methods are passive in that signals produced from a target area are measured without first transmitting a signal to the target area. An example of a passive geophysical EM prospecting method is Audio Frequency Magnetic ("AFMAG") surveying in which the EM fields resulting from naturally occurring primary signal sources such as lightning discharges are measured. These EM fields propagate around the earth as plane waves guided by the ionosphere and earth's surface. Lightning activity occurring remote from the measurement point can produce signals with a nearly flat spectral density at frequencies between, for example, 8 Hz and 500 Hz, varying with geographical location, time of the day, seasons and weather conditions. An example of a passive AFMAG geophysical EM prospecting method is shown in U.S. Pat. No. 6,876,202.

A tow assembly that can be efficiently used in conjunction with a fixed wing aircraft is desirable.

SUMMARY

According to one example embodiment is an airborne geophysical electromagnetic (EM) survey tow assembly system for use with a fixed wing aircraft. The system includes a receiver coil assembly comprising a substantially rigid tubular receiver coil frame forming a continuous internal passageway that extends around a central open area, and a receiver coil housed within the internal passageway; a winch system for securing to the fixed wing aircraft, the winch system having a tow cable secured to the receiver coil assembly and being configured to extend the tow cable to suspend the receiver coil assembly from the fixed wing aircraft with the receiver coil in a nominally horizontal orientation during a survey and to retract the tow cable to draw the receiver coil assembly into a retracted position at the underside of the fixed wing aircraft for takeoff and landing; and a latch system for mounting to an underside of the aircraft having releasable latch members to engage the receiver coil assembly when the receiver coil assembly is in the retracted position.

According to another example embodiment is an airborne geophysical electromagnetic (EM) survey system that includes: a fixed wing aircraft; a receiver coil assembly comprising a substantially rigid tubular receiver coil frame forming a continuous internal passageway that extends around a central open area through which air can pass through the receiver coil frame, a receiver coil housed within the internal passageway, and an elongate support member extending across the central open area between spaced apart locations of the receiver coil frame; a winch system mounted to the fixed wing aircraft, the winch system having a tow cable secured to the receiver coil assembly and being configured to extend the tow cable to suspend the receiver coil assembly from the fixed wing aircraft with the receiver coil in a nominally horizontal orientation during a survey and to retract the tow cable to draw the receiver coil assembly into a retracted position at the underside of the fixed wing aircraft for takeoff and landing; a latch system for mounted to an underside of the aircraft having releasable latch members for engaging the elongate support member when the receiver coil assembly is in the retracted position; and signal processing equipment in communication with the receiver coil for receiving signals therefrom representative of EM fields generated by a surveyed terrain in response to naturally occurring electrical events.

According to another example embodiment is a method for conducting an airborne geophysical survey using a fixed wing aircraft. The method includes: providing a receiver coil assembly comprising a substantially rigid tubular receiver coil frame forming a continuous internal passageway that extends around a central open area through which air can pass through the receiver coil frame, and a receiver coil housed within the internal passageway; providing on the fixed wing aircraft a winch system having a tow cable secured to the receiver coil assembly and being configured to extend the tow cable to suspend the receiver coil assembly from the fixed wing aircraft and to retract the tow cable to draw the receiver coil assembly into a retracted position at the underside of the fixed wing aircraft for takeoff and landing; providing on an underside of the fixed wing aircraft a latch system having releasable latch members to engage the elongate support member when the receiver coil assembly is in the retracted position; and extending the tow cable during flight of the fixed wing aircraft to suspend the receiver coil frame in a nominally horizontal position and receiving signals from the recover coil.

BRIEF DESCRIPTION OF THE DRAWINGS

Example embodiments are provided in the following description. Such description makes reference to the annexed drawings wherein.

DESCRIPTION OF EXAMPLE EMBODIMENTS

Figure 1:
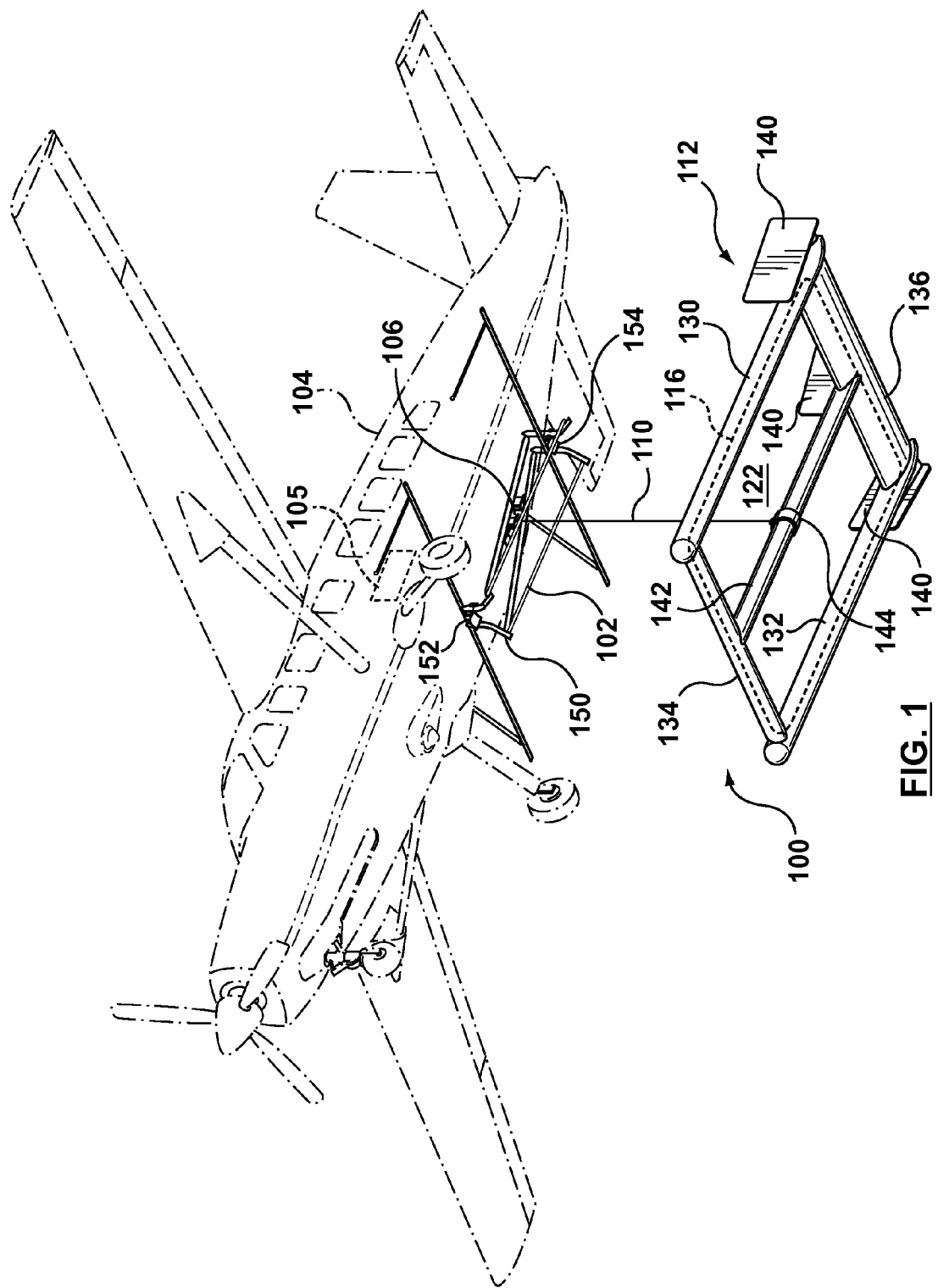
FIG. 1 is a perspective view of an airborne geophysical electromagnetic (EM) survey tow assembly system, including a receiver coil assembly suspended from a tow and latch assembly that is secured to a fixed wing aircraft, according to example embodiments.
Figure 2:
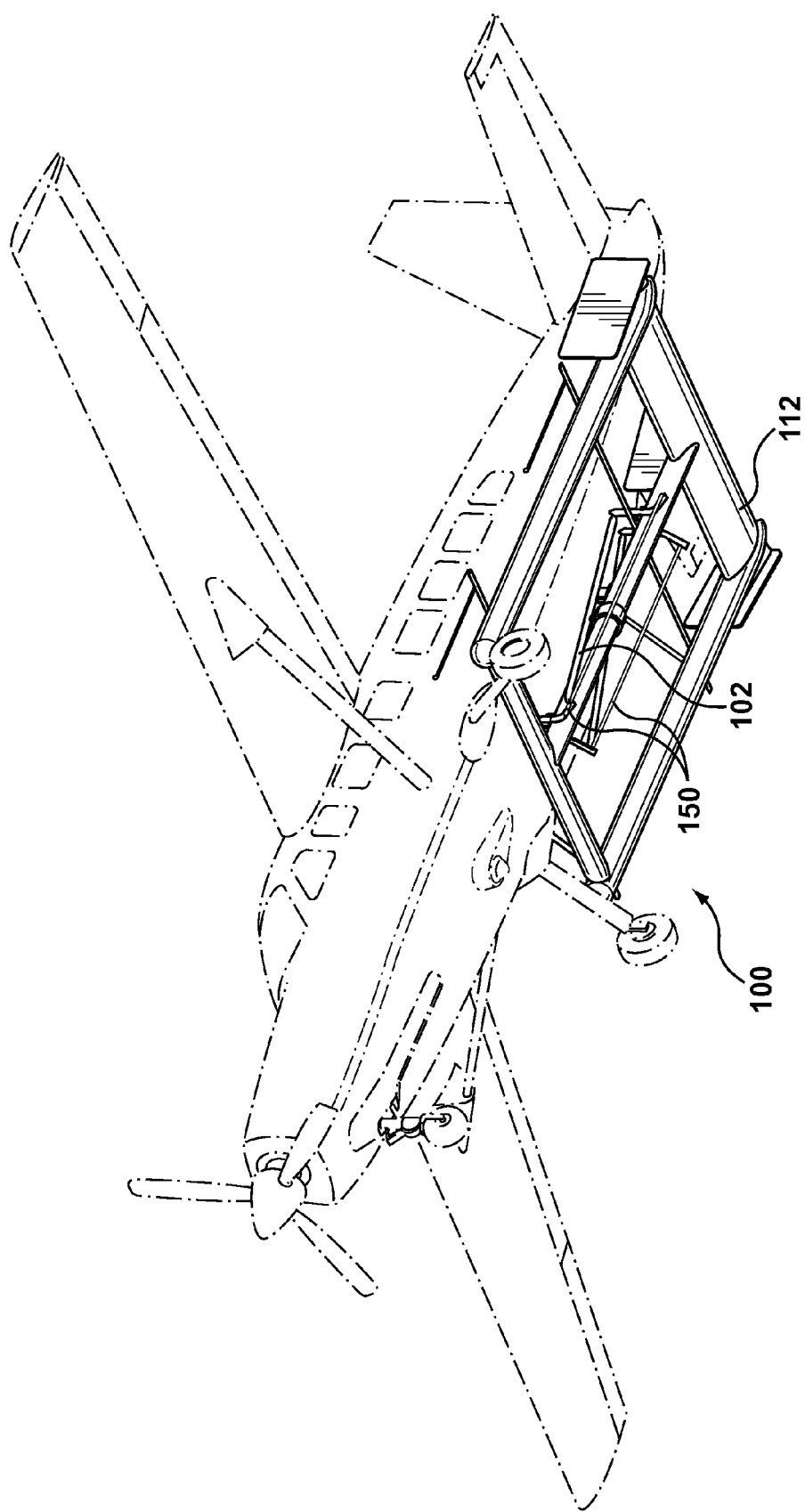
FIG. 2 is a perspective view of the airborne geophysical survey tow assembly system of FIG. 1, with the receiver coil assembly nested in the tow and latch assembly that is secured to the fixed wing aircraft.

FIGS. 1 and 2 show an airborne geophysical electromagnetic (EM) survey tow assembly system 100 that includes a receiver coil assembly 112 and a tow and latch assembly 102, according to example embodiments of the invention. The tow and latch assembly 102 is secured to the underside of a fixed wing aircraft 104 and includes a winch system 105 with a retractable tow cable 110 for suspending and retracting the receiver coil assembly 112. The winch system 105 can for example include a hydraulically driven winch that is located inside the body of the aircraft, with the tow cable 110 extending through an opening 106 in the aircraft body. The receiver coil assembly 112 is shown hanging from tow cable 110 from the tow and latch assembly 102 in a suspended position in FIG. 1. In particular, in FIG. 1 the receiver coil assembly 112 is shown with the tow cable 110 being in a partially extended or partially retracted position as the receiver coil assembly 112 is being deployed from or retracted back to the aircraft. The receiver coil assembly 112 may by way of non limiting example be suspended about 100 meters (or greater or less amounts) for flying a geophysical survey. FIG. 2 shows the receiver coil assembly 112 in a retracted position secured by tow and latch assembly 102 to an underside of the aircraft 104. Typically the receiver coil assembly 112 will be kept in the retracted position when a survey is not being conducted—for example when flying to or from a survey location and during take-off and landing. Suspending the receiver coil assembly 112 as shown in FIG. 1 during a geophysical survey mitigates against noise caused by the towing aircraft 104.

Figure 4:
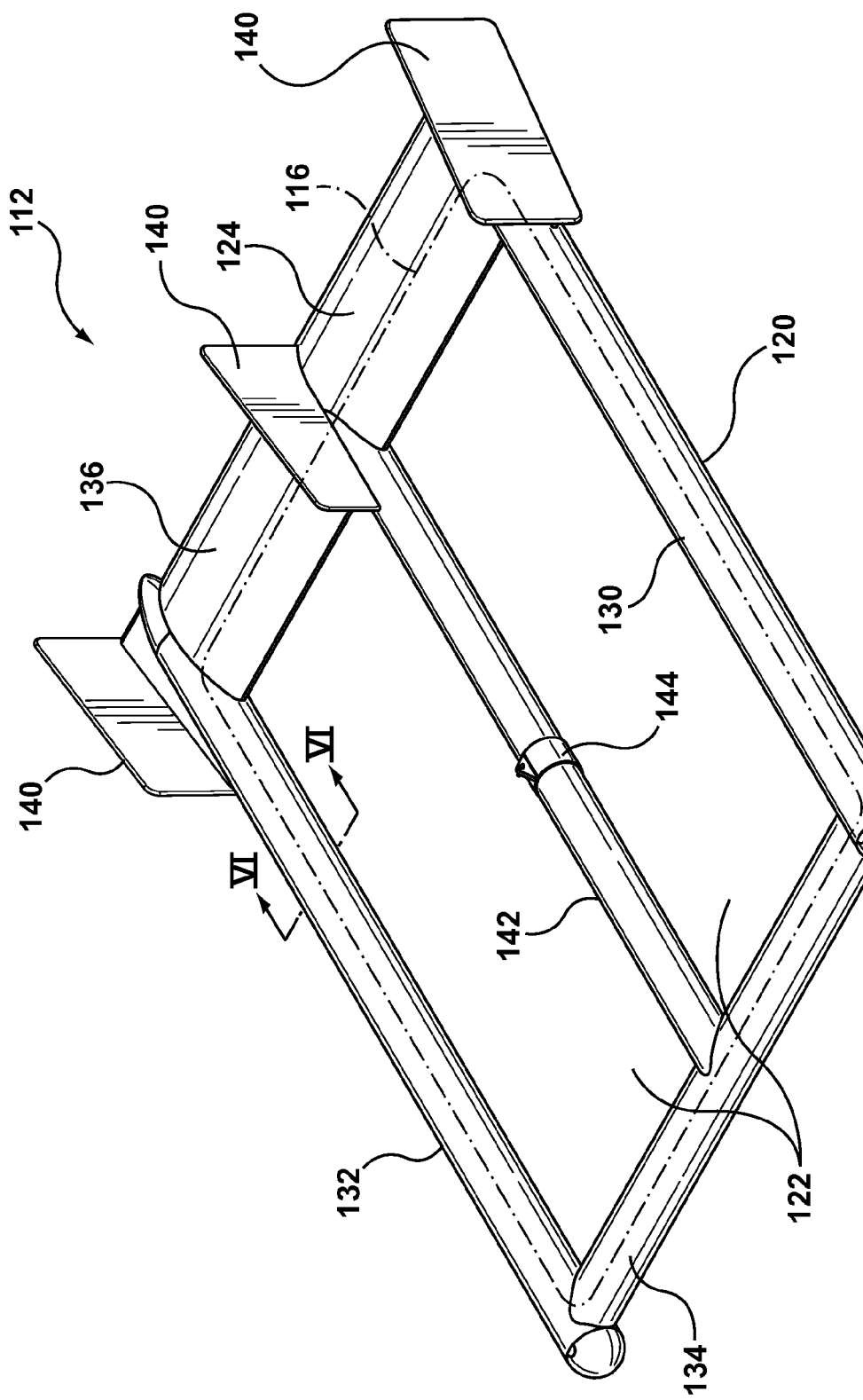
FIG. 4 is a perspective view of the tow assembly of the airborne geophysical survey receiver coil assembly system of FIG. 1.

Referring to FIGS. 1 and 4, the receiver coil assembly 112 includes a substantially rigid aerodynamic tubular receiver coil frame 120 that defines a rectangular internal passageway 124 in which a rectangular multi-turn receiver loop or coil 116 (illustrated by dashed lines) is housed. As will be appreciated from the Figures, the receiver coil frame 120 forms a loop such that internal passageway 124 is a continuous closed loop. In the illustrated embodiment, the receiver coil frame 120 has a substantially rectangular shape that defines the perimeter of a central open area or opening 122. The internal passageway 124 extends around the central open area 122 and air can pass through the central open area 122. The rectangular receiver coil frame 120 is formed by a pair of parallel tubular side frame members 130, 132 interconnected by front and back parallel tubular frame members 134, 136. In the illustrated embodiment, the tubular side frame members 130, 132 are longer than the front and back parallel tubular frame members 134, 136, and vertical stabilizing fins 140 are positioned near the back or trailing end of the rectangular receiver coil frame 120 to assist in keeping the frame oriented in a consistent direction during flight with the receiver coil 120 in a nominally horizontal orientation with its axis vertically oriented.

In an example embodiment, a central boom in the form of an elongate support member 142 extends from front tubular frame member 134 to back tubular frame member 136 across the middle of the central opening 122. As illustrated embodiment, the central support member 142 may be located substantially between and parallel to the side tubular frame members 130, 132, and includes a central tow cable fastener 144 to which the tow cable 110 is connected. Each of the tubular frame members 130, 132, 134 and 136 and the support member 142 may be shaped to provide the receiver coil tow assembly 112 with a shape that mitigates air-flow resistance and vibration and also maintains the tow assembly in a consistent orientation while it is being towed. In this regard, the tubular members can be streamlined and faired relative to their respective orientation within the receiver coil frame—for example back tubular frame member 136 may have a flat wing-like configuration. The tubular frame members 130, 132, 134 and 136 and the support member 142 can be formed from substantially from materials that are electrically insulating and non-magnetic such as fiberglass.

Figure 3:
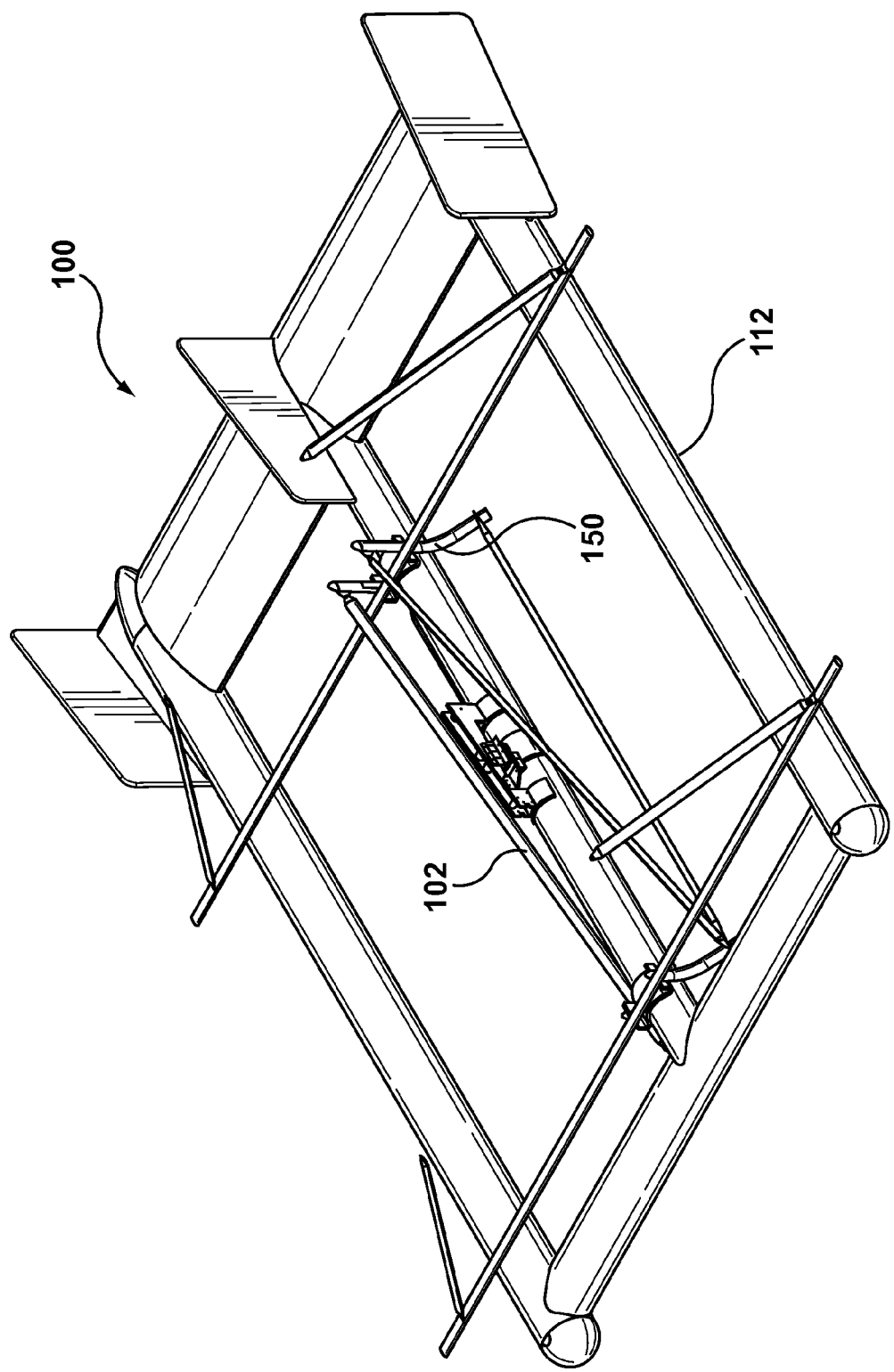
FIG. 3 is a perspective view of the airborne geophysical survey tow assembly system of FIG. 1, with the receiver coil assembly nested in the tow and latch assembly.
Figure 3A:
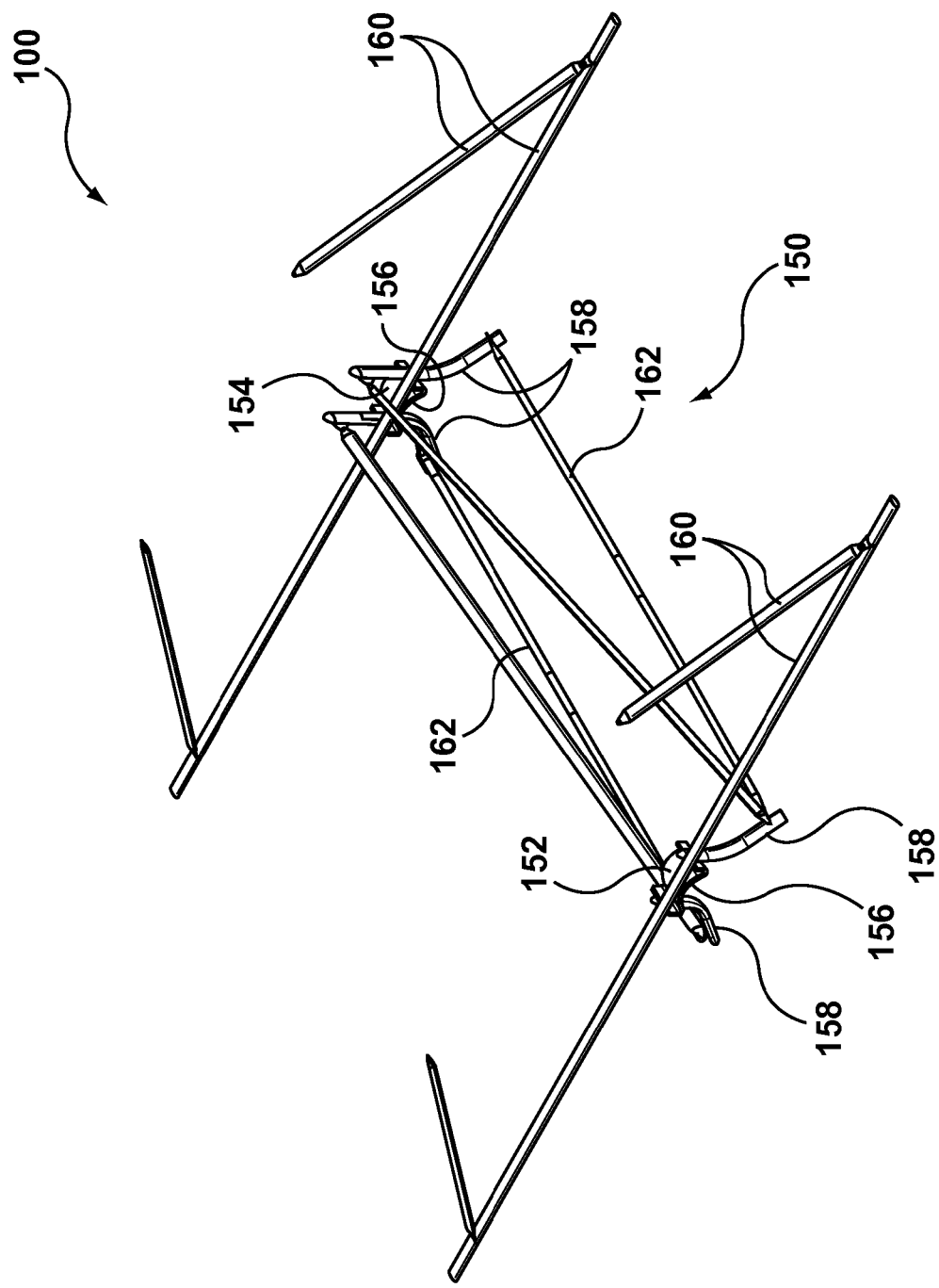
FIG. 3A is a perspective view of a latch system of the tow and latch assembly of the airborne geophysical survey tow assembly system of FIG. 1.

Referring to FIGS. 1-3A, the tow and latch assembly 102 includes a mechanically or hydraulically driven latch system 150. As best shown in FIG. 3A, in the illustrated embodiment, the latch system 150 includes spaced apart front and back latch members 152, 154 for securely engaging the central support member 142 of the receiver coil assembly 112 when the receiver coil assembly is in its retracted, latched position under the aircraft 104. Each of the front and back latch members 152, 154 include a respective pair of opposed, pivotally mounted latch arms 158 for engaging opposite sides of the outer surface of the central support member 142, and an upper cradle member 156 for engaging a top surface of the central support member 142. The latch arms 158 can include diverging lower ends to act as a guide for central support member 142 as the receiver coil assembly is moved into or out of its retracted position. In the illustrated embodiment, tie rods 162 may be used to mechanically link the latch arms 158 so that the front and back latch members 152, 154 operate in unison. The latch system 150 includes a strut system 160 for securing it to the aircraft 104. Alternative latch system configurations can be used to secure the receiver coil assembly 112 to the aircraft, the above described latch system being but one example.

Turning again to the receiver coil frame 120, in an example embodiment the frame is configured so that it can be split along a horizontal plane to allow the receiver coil 136 to be inserted, serviced and removed from the rectangular internal coil passageway 124. In at least some example embodiments elastic suspension system is used to secure the receiver coil 116 within the rectangular internal coil passageway 124, and in this regard FIGS. 6-10 illustrate three different possible receiver coil suspension systems.

Figure 6:
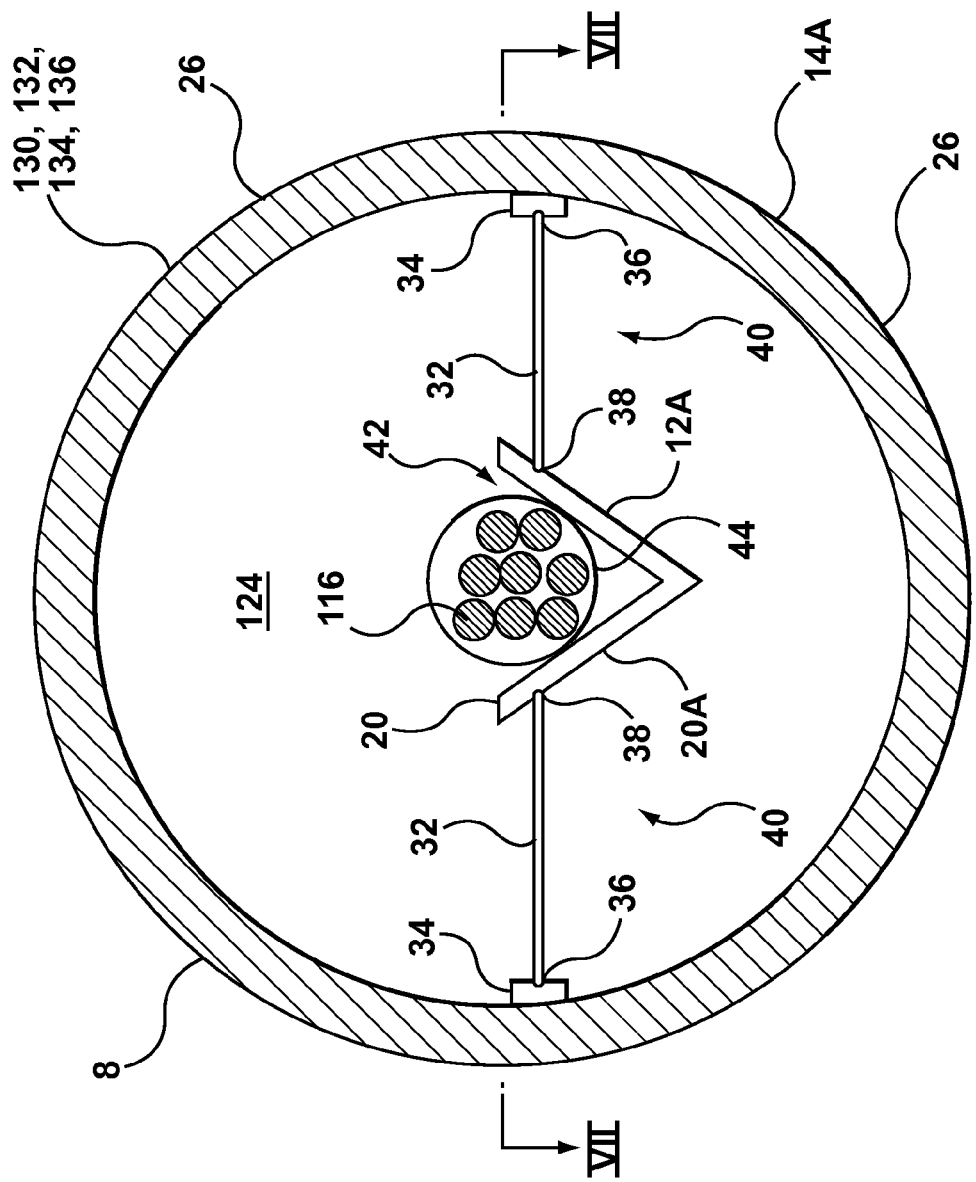
FIG. 6 is a sectional view of one of the side members of the receiver coil assembly taken along the lines VI-VI of FIG. 4, according to an example embodiment.
Figure 7:
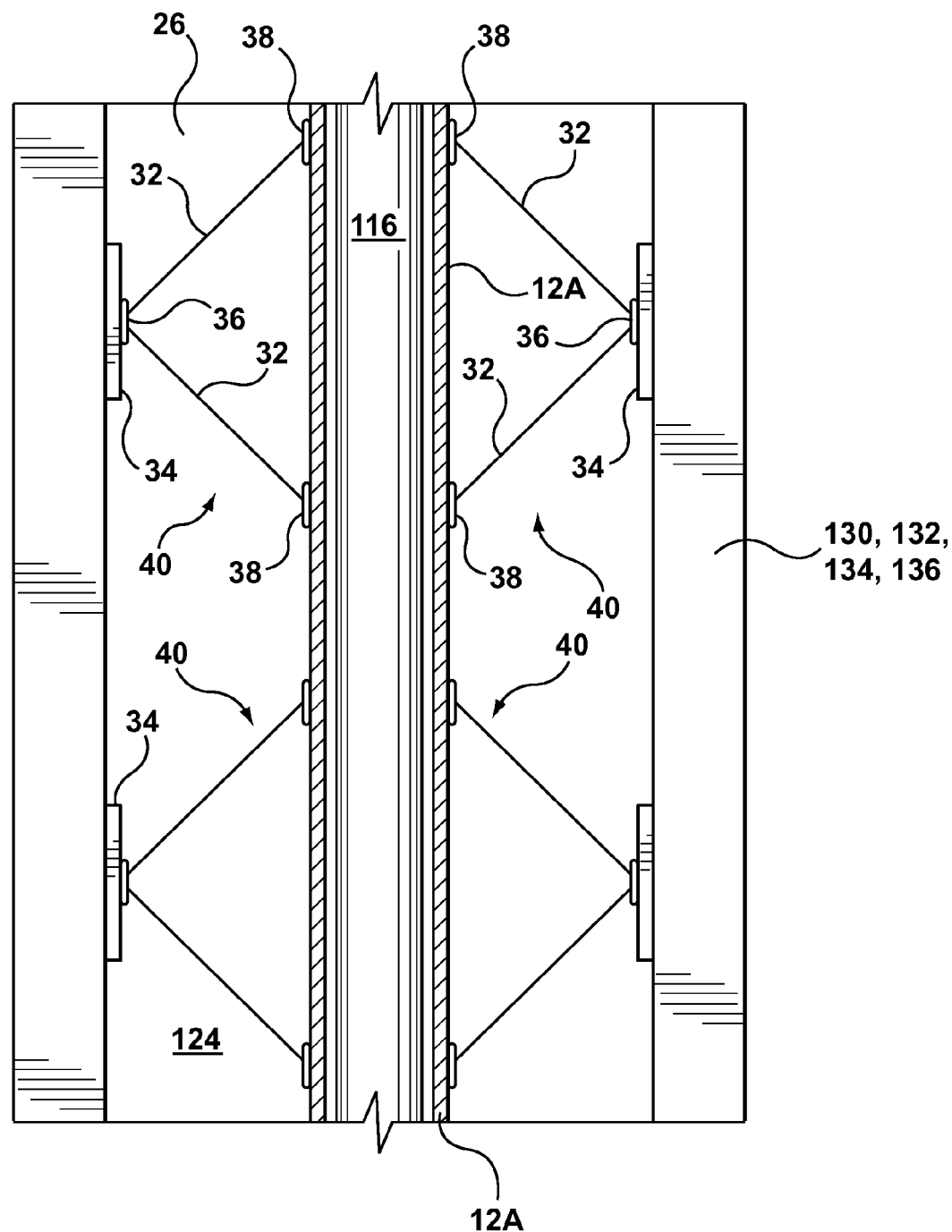
FIG. 7 is a sectional view of one of the side members of the receiver coil assembly taken along lines VII-VII of FIG. 6.

A single suspension receiver coil suspension system is illustrated in FIGS. 6 and 7. Such system includes a rectangular inner frame member 12A elastically suspended at the center of the coil passage 124 by multiple fastening assemblies 40 that are spaced internally along the length of each of the tubular frame members 130, 132, 134 and 136 (although shown as having a circular cross-section in FIG. 6, such members can have different cross-sectional shapes as will be appreciated from the previous Figures). Rectangular inner frame member 12A may be a rigid open-topped trough in which the receiver coil is secured. Each fastening assembly 40 includes an elastic suspension member 32 that extends between the inner wall of the tubular frame member 130, 132, 134 and 136 and the inner frame member 12A. In one example embodiment, each elastic suspension member 32 (which may for example be formed from rubber) is secured at opposite first and second ends 38 to longitudinally spaced locations on a side of the inner frame member 12A, and at an approximate mid-point 36 to the inner wall of the tubular frame member 130, 132, 134 and 136 such that the elastic suspension member 32 forms a "V" shape that applies opposing longitudinal forces to the inner frame member 12A as well as a lateral force. (It will be appreciated that the "V" shaped elastic member could be replaced with two separate elastic pieces.) A fastening block 34 may be secured by adhesive or other fastener to the inner wall of the tubular frame member 130, 132, 134 and 136 to provide a surface for securing the mid-point 36 by a bolt or other fastener. In the illustrated embodiment, fastening assemblies 40 are located in pairs on opposite sides of the inner frame section 12A such that substantially equal but opposite forces are applied to the inner frame section 12A by the elastic suspension members 32 so that the inner frame section 12A normal resting position is in the center of the coil passage 124 defined by tubular frame member 130, 132, 134 and 136. In one example embodiment, the elastic suspension members 32 in a split tubular frame member 130, 132, 134 and 136 are all secured to one half thereof (for example a bottom half) to facilitate securing the inner frame section 12A in place before closing up the receiver coil passage 124 with the other half.

Elastic members 32 can be formed from rubber or other suitable elastic or material. The fastening assembly 40 could take many different configurations than is shown in FIGS. 6 and 7 to elastically suspend the inner frame member 12A.

In some embodiments the inner frame member 12A has a V-shaped cross-section and defines an open-sided trough 42 that provides an inner cable passage 44 in which the receiver coil 16A is received. In some example embodiments, the inner frame member 12A could alternatively have a semi-rectangular, or semi-circular or circular or other cross-sectional area. In at least some embodiments the receiver coil 116 is a loop or multi-turn coil formed that is secured in the trough 42 by tape and/or other type of fastening mechanism.

Figure 8:
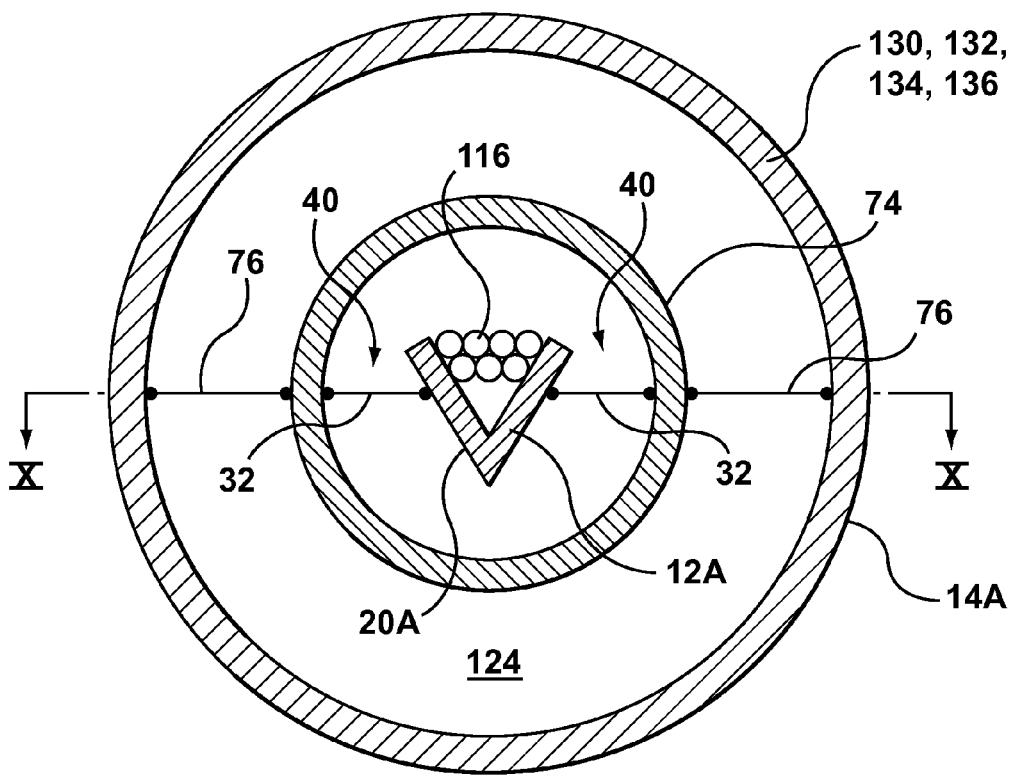
FIG. 8 is a sectional view of one of the side members of the receiver coil assembly taken along the lines VI-VI of FIG. 4, according to another example embodiment.
Figure 9:
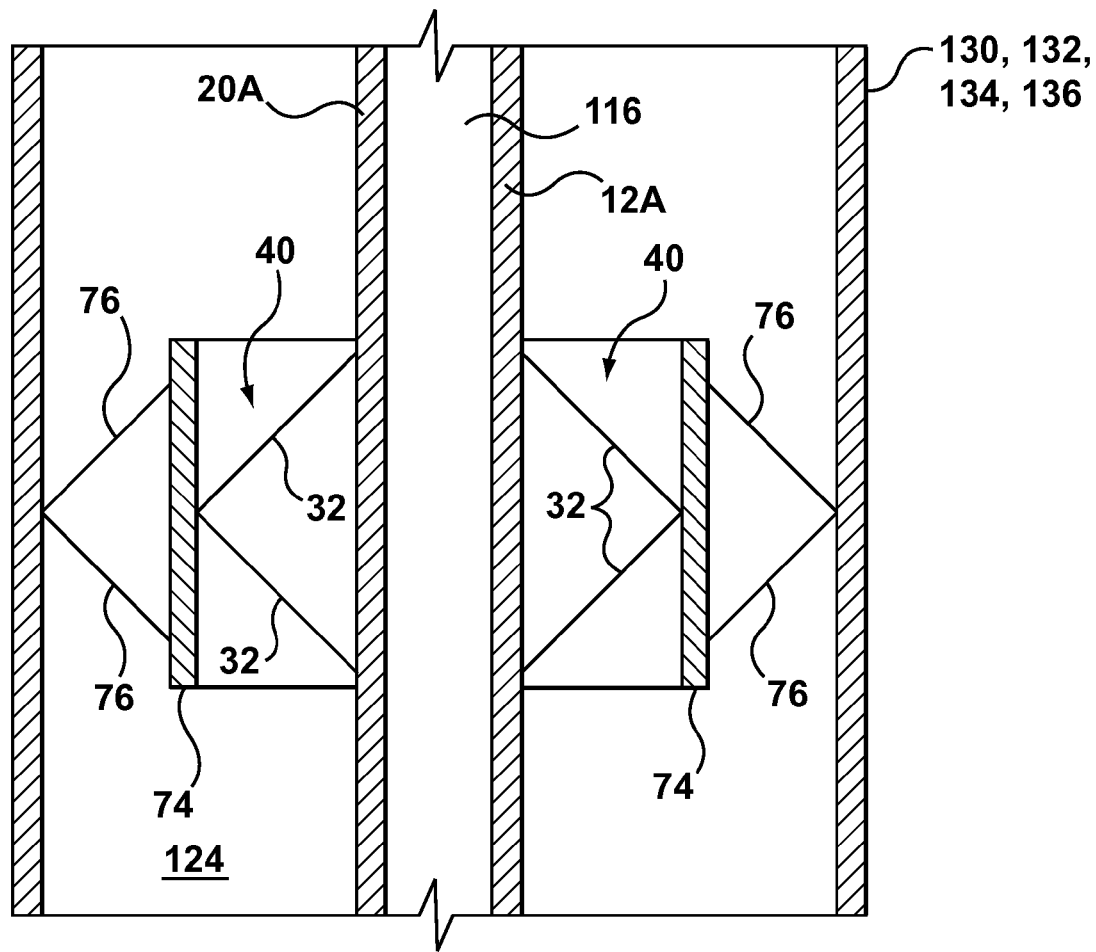
FIG. 9 is a sectional view of one of the side members of the receiver coil assembly taken along lines X-X of FIG. 8.

Referring to FIGS. 8 and 9, in another alternative embodiment, a double suspension system is used to suspend the receiver coil interior frame 12A within the outer tubular frame members 130, 132, 134 and 136 of receiver coil assembly 112. Although shown as having a cylindrical cross section, tubular frame members 130, 132, 134 and 136 can have other cross-section configurations as shown in previous Figures. In the double suspension configuration of FIGS. 8 and 9, the suspension assemblies 40 located along the lengths of each of the internal frame members 12A are connected to intermediate frame members 74, which are in turn suspended from the outer frame members 130, 132, 134 and 136. For example, first elastic suspension members 32 opposingly suspend the inner frame member 12A in the center of a cylindrical or semi-cylindrical intermediate frame section 74, which is then centrally suspended in a similar manner by further elastic members 76 that extend between the intermediate frame section 74 and the outer frame member 130, 132, 134 or 136. As can be seen in FIG. 9, the further elastic members 76 can also be arranged in V-shaped pattern to act against longitudinal movement as well as radial movement in a similar manner as the first elastic suspension members 32. As noted above, intermediate frame section 74 can be semi-cylindrical, which allows easy access to the interior of the frame section 74 during assembly and repair.

Thus, in the embodiment of FIGS. 8 and 9, the inner frame section 20A that supports receiver coil 116 is suspended by a number of first elastic suspension members 32 to a number of respective intermediate frame sections 74 which are in turn suspended by one or more second elastic suspension members 76 (which may for example be formed from rubber) from the outer frame 14A. The inner frame section 12A may further be positioned at or near the centre of the passageway 124. Regions that are (i) proximate the connections between the first suspension members 32 and each of the inner frame section 12A and the intermediate frame sections 74, and (ii) proximate the connections between the second suspension members 76 and each of the intermediate frame sections 74 and the outer frame members can be coated with a friction reducing agent such as silicone. A silicone coating may reduce the noise caused by rubbing at the attachment or connection point. In some example embodiments, the first suspension members may be connected to the respective frame sections by cable ties that pass through pre-drilled holes or attached loops. Alternatively, any number of other possible methods can be used to attach the first and second suspension members including: hooks, or a machined hook-like attachment point connected to the attachment points whereby the suspension members may be looped around the hooks and then covered by silicone; alternatively, loops on the first and second suspension members can be screwed into the attachment points; another possibility is to glue the first and second suspension members to the inner frame, and to the outer frame or intermediate frame sections.

Figure 10:
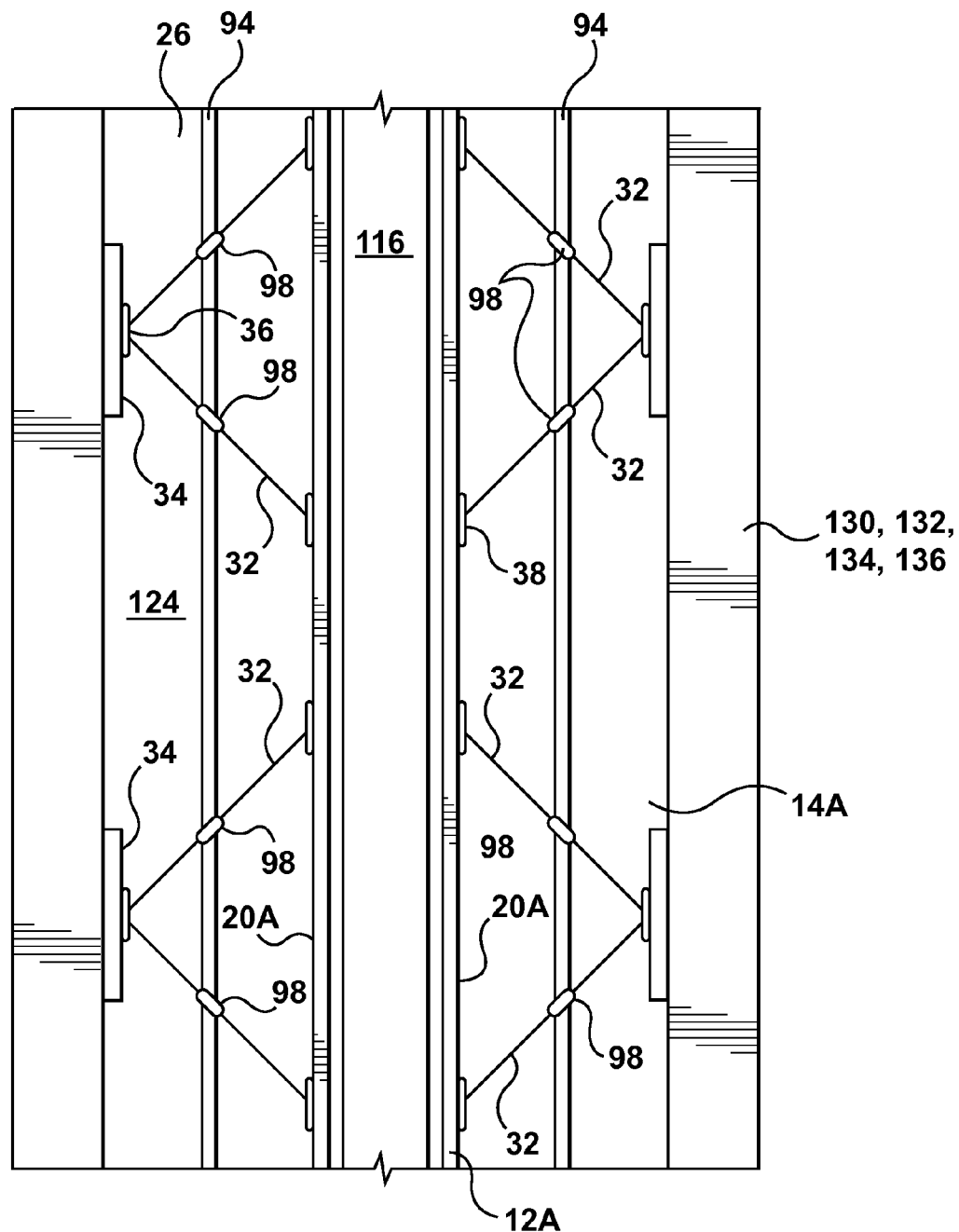
FIG. 10 is a sectional view of one of the side members of the receiver coil assembly according to another example embodiment.

As shown in FIGS. 8 and 9 both the first and second suspension members 32 and 76 extend at an angle other than 90 degrees to both radially and longitudinally bias the inner frame section 12A and the receiver coils 116 in a central position in internal receiver coil passages 124, respectively. The single and double suspension arrangements that are discussed above may in at least some embodiments improve the signal to noise ratio SNR of the receiver coil assembly by reducing the effects of vibration of the receiver coil assembly on the receiver coil. In other example embodiments, other support mechanisms can be used including triple-suspension, springs, surrounding the coil with foam, or other means of positioning the coil in the centre of the inner frame in a manner that reduces noise FIG. 10 illustrates another possible suspension configuration for the internal frame 12A. The configuration shown in FIG. 10 is similar to that descried above in respect of FIGS. 6 and 7, with the addition of intermediate rigid rods 94 that run longitudinally in passage 124 between the opposite sides of the internal frame 12A and the wall defined by the outer frame member 130, 132, 134 or 136. The elastic suspension members 32 on one side of the internal frame 12A are each attached at approximately a midpoint 98 to one of the rigid rods 94, and the elastic suspension members 32 on the opposite side of the internal frame 12A are each attached at a midpoint 98 to the other of the rigid rods 94. The rods 94 can tie the suspension members together to spread forces applied to any individual member among a number of suspension members. Additionally, the rods 94 themselves can act as energy absorbing structures. The rods 94 can in some embodiments be broken into smaller rod sections.

Further example embodiments of coil suspension systems suitable for use in the receiver coil assembly 112 can be seen for example in patent applications PCT/CA2009/000607 and U.S. Ser. No. 12/118,194, the respective contents of which are incorporated herein by reference.

Using a rectangular frame with open center configuration such as the receiver coil tow assembly 112 can, in at least some configurations, support a relatively large loop receiver coil 116 in a light weight and aerodynamic manner when compared for example to torpedo-style birds that have in the past been towed from fixed-wing aircraft.

Although the receiver coil tow assembly has been described as having a rectangular loop configuration with a central support member, other open-centered frame styles may alternatively be used, including for example triangular shaped configurations, five or more sided simple polygonal shaped configurations, or circular or oval or elliptical shaped configurations, among others.

In some example embodiments, the geophysical electromagnetic (EM) survey tow assembly system 100 is configured for use in an AFMAG-type geophysical prospecting system that depend on tipper or tilt angle measurements as shown for example in above-mentioned U.S. Pat. No. 6,876,202, incorporated herein by reference. In such an application, attitude sensors can be located on the receiver coil assembly 112 so that the orientation of such assembly can be detected and the orientation information used in the calculation of tilt angle information that is derived from the signals collected from the receiver coil assembly. For example, one or more accelerometers can be secured to the coil assembly 112 to determine attitude information. Alternatively, GPS receivers can be placed at spaced apart locations on the receiver coil assembly in order to track its attitude.

Figure 5:
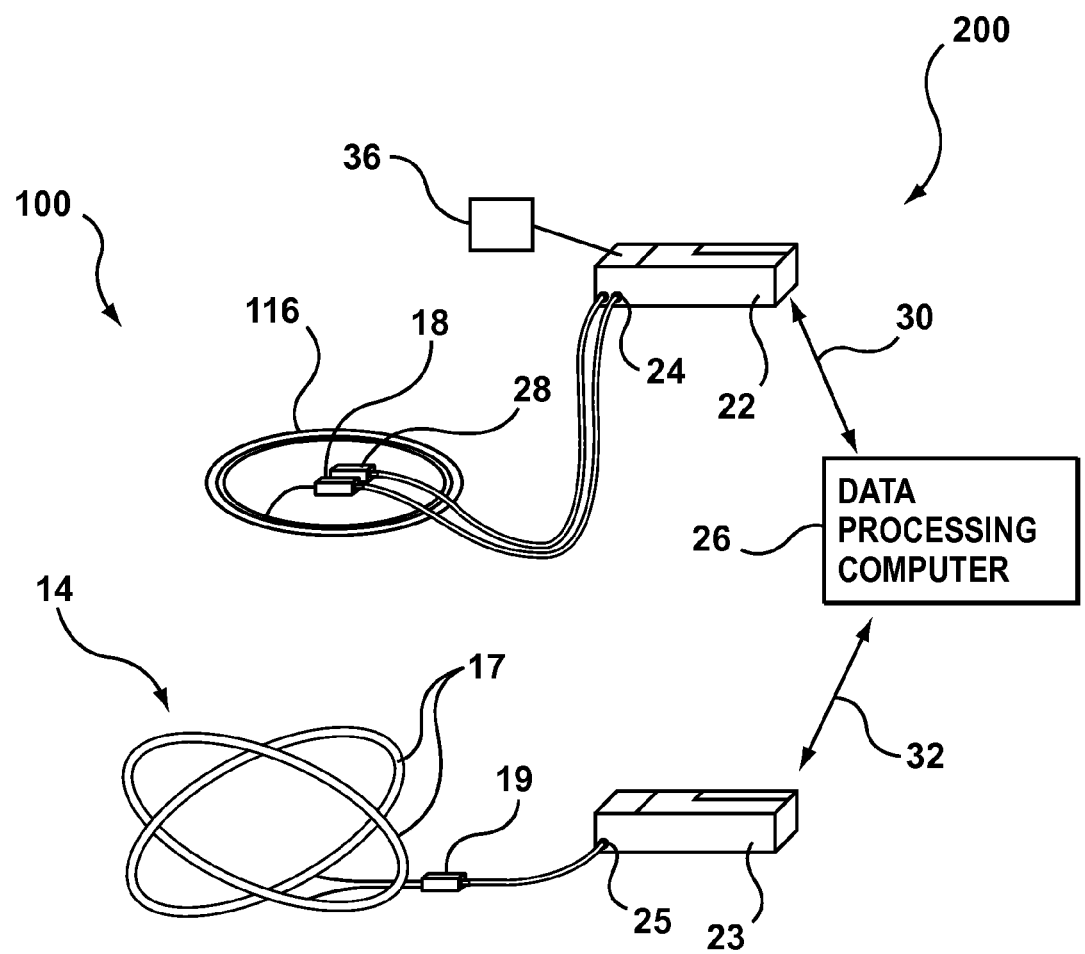
FIG. 5 shows a representation of an AFMAG geophysical prospecting system that incorporates the airborne geophysical survey tow assembly system of FIG. 1, according to one example embodiment of the invention.

In this regard, FIG. 5 illustrates an AFMAG survey system 200 according to an example embodiment that incorporates the geophysical electromagnetic (EM) survey tow assembly system 100. As noted above, AFMAG systems measure EM fields resulting from naturally occurring primary signal sources. The AFMAG system 200 includes geophysical electromagnetic (EM) survey tow assembly system 100 and a ground assembly 14. The geophysical electromagnetic (EM) survey tow assembly system 100 is mounted to a fixed wing aircraft to be towed over a survey area and includes receiver coil 116 and a low noise amplifier 18. In an example embodiment the receiver coil 116 is configured to have a vertical dipole orientation during flight in order to provide electromagnetic field measurements in the Z axis. The tow assembly system 100 is connected to signal processing equipment that is generally disposed inside the aircraft such as a computer 22 that includes an analog to digital converter device (ADC) 24 connected to receive the output of the low noise amplifier 18. The on-aircraft computer 22 is equipped with one or more storage elements that can include RAM, flash memory, a hard drive, or other types of electronic storage, and may be configured to perform data processing functions on signals received from sensor 16.

In an example embodiment, the tow assembly system 100 also includes a spatial attitude detection device 28 to compensate for the roll, pitch or yaw of air assembly 12 and particularly coil 116 in flight that can cause anomalies in measurement of the tilt angles produced by the electromagnetic fields by electromagnetic sensor coil 116. The spatial attitude detection device 28 includes inclinometer devices for measuring the roll, pitch and yaw of the coil assembly 112 and particularly sensor coil 116 during flight at any given moment. In addition for yaw measurements, the spatial attitude detection device 28 may comprise a device for tracking the flight path such as a compass utilizing the direction of the geomagnetic field vector. In example embodiments, the coil assembly 112 or host aircraft 104 can include a Global Positioning System ("GPS") device such that data obtained from sensor coil 116 and spatial attitude detection device 28 can be correlated with geographical position and GPS time and ultimately used either at computer 22 or a remote data processing computer 26 to correct the measurements of the electromagnetic field tilt angles to reflect the movements of the coil assembly 112 and particularly sensor coil 116, and correlate the electromagnetic field data obtained from sensor 116 with the spatial attitude data of coil assembly 112. This allows the creation of survey data that can be adjusted based on variations of the spatial attitude of the sensor coil 116 during flight.

In an example embodiment, the airborne equipment also includes a geographic relief measurement device 36 connected to the airborne computer 22 in order to allow compensation for geographical relief that could otherwise distort horizontal magnetic fields by producing false anomalies of tilt angles even where there are very homogeneous rocks beneath the ground surface. Geographic relief measurement device 36 collects data for post flight (or in some cases real-time) calculations of the tilt angles of geographical relief in the survey area. In one example embodiment, the geographic relief measurement device 36 includes a first altimeter device that provides data regarding absolute altitude of the airborne sensor 16 above a fixed reference (for example sea level) and a second altimeter device that providing data regarding the relative altitude of the of the airborne sensor 16 above the actual survey terrain. Comparing the relative altitude data and absolute altitude data in the local co-ordinate system of the survey area allows an evaluation of the geographic relief of the survey area that can be used to calculate the tilt angles of the survey area geographic relief.

The ground assembly 14 is configured to be placed on a stationary base point, and includes at least a pair of electromagnetic sensors 17 connected through a low noise amplifier 19 to a ground assembly computer 23. In an example embodiment the electromagnetic sensors 17 are receiver coils configured to provide electromagnetic field measurements in the X and Y axes. The computer 23 includes an analog to digital converter device (ADC) 25 connected to receive the output of the low noise amplifier 19, and is equipped with one or more storage elements that can include RAM, flash memory, a hard drive, or other types of electronic storage, and may be configured to perform data processing functions on signals received from sensors 17. The ground assembly can also include a GPS receiver so that the X and Y axis data received from sensors 17 can be time stamped with a GPS clock time for correlation with the Z axis data that is recorded by airborne computer 22. (Z-axis being the vertical axis and X and Y being orthogonal horizontal axis.)

In an example embodiment, the data collected by airborne computer 22 and the data collected by the ground computer 23 is ultimately transferred over respective communication links 30, 32 (which may be wired or wireless links or may include physical transfer of a memory medium) to a data processing computer 26 at which the electromagnetic field data obtained from sensors 16 and 17, the attitude data from spatial attitude detection device 28, data from geographic relief measurement device 36, and the GPS data from GPS sensors associated with each of the air assembly 12 and ground assembly 14 can all be processed to determine the tipper attributes for the survey sight using techniques as set out for example in U.S. Pat. No. 6,876,202. Such information can them be used to determine conductivity patterns for the survey site to identify anomalies for future exploration.

Accordingly, in one example embodiment the receiver coil assembly 112 (also referred to as the "bird") will now be described by way of non limiting example. In such example, the bird 112 houses multi-turn rectangular loop or coil 116 together with its suspension system and electronics. In towed flight the axis of the coil 116 is nominally vertical. The size of the loop is limited by the space available beneath the towing aircraft for stowing the loop during takeoff and landing. In the case of a Cessna 208B towing aircraft, loop dimensions may by way of non-limiting example be 3 m center-to-center in the lateral direction and 4 m center-to-center in the longitudinal direction. In the case of a larger towing aircraft, a larger loop, for example up to 8 m laterally and longitudinally, may be used to provide improved signal to noise ratio. Smaller loops, for example 3 m laterally and longitudinally, may provide useful results when used with smaller aircraft. The central open area 122 has dimensions just less than that of the coil 116. The mass of the loop, suspension system, and electronics may for example be approximately 60 kg, distributed approximately uniformly around the receiver coil support frame, while in some embodiments the bird may have a total mass of 150 kg, more or less. In one example, the bird 112 contains an enclosed clear passageway 224 with at least a circular cross section 0.22 m inside diameter for installation of the loop. Multiple attachment points are provided on the inner surface of the passageway 224 for suspending the coil 116. The bird 112 can be split along a horizontal plane to open the passageway to allow the loop 116 and suspension to be installed or serviced without breaking the loop.

In some example embodiments, the bird 112 is constructed of materials that are electrically insulating and non-magnetic, except that fasteners made of brass, aluminum or 316 stainless steel may be used. The bird 112 components are streamlined and faired to minimize vibration caused by airflow past the bird 112. In one example of a survey flight, the bird 112 is towed from a fixed aircraft such as, for example, a Cessna 208B Caravan aircraft at 80-120 knots airspeed on 100 m of cable. For takeoff, cruise, and landing the bird 112 is secured in a cradle (latch system 150) attached to the bottom of the aircraft fuselage. In some example embodiments, the tow cable 110 can be an electromechanical cable including a load bearing cable with a conductor equivalent to RG58A/U coaxial cable or better, or alternatively it may contain at least four twisted pairs of at least AWG 20. The load bearing cable of tow cable 110 is made substantially of non-magnetic materials.

The tow and latch assembly includes a hydraulically powered winch system 105 installed on the aircraft 104 which deploys the bird 112 and recovers it to the cradle while in flight under control of an operator in the aircraft. In one example, in towed flight, the bird 112 is aerodynamically stable and the pitch and roll attitude of the passageway 224 for the loop 116 is horizontal ±5°. In some example embodiments, the tow point on the bird can be manually changed fore and aft while on the ground by adjusting the position of tow cable fastener 144 to achieve a horizontal flight attitude. An alternative to the electromechanical tow cable is to use a non-electrical tow cable and to use a battery operated radio telemetry system to transmit data to the aircraft.

It will be appreciated by those skilled in the art that other variations of the embodiments described herein may also be practiced without departing from the scope of the invention. Other modifications are therefore possible.

The invention claimed is:

1. An airborne geophysical electromagnetic (EM) survey tow assembly system for use with a fixed wing aircraft, comprising:
    a receiver coil assembly comprising a substantially rigid tubular receiver coil frame forming a central open area and a continuous internal passageway that extends around the central open area, and a receiver coil housed within the internal passageway;
    a winch system secured to the fixed wing aircraft, the winch system having a tow cable secured to the receiver coil assembly and being configured to extend the tow cable to suspend the receiver coil assembly from the fixed wing aircraft with the receiver coil in a nominally horizontal orientation during a survey and to retract the tow cable to draw the receiver coil assembly into a retracted position at the underside of the fixed wing aircraft during takeoff and landing; and
    a latch system mounted to an underside of the aircraft having releasable latch members to engage the receiver coil assembly when the receiver coil assembly is in the retracted position.

2. The system of claim 1 wherein the receiver coil frame is formed by a pair of spaced apart parallel tubular side frame members interconnected at a front end thereof by a front tubular frame member and interconnected at a back end thereof by a back tubular frame member.

3. The system of claim 2 comprising an elongate support member extending across the central open area from the front tubular frame member to the back tubular frame member, wherein the tow cable is attached to the elongate support member.

4. The system of claim 3 wherein the latch members includes a first pair and a second pair of opposed latch arms for releasably latching the elongate support member to engage the receiver coil assembly when the receiver coil assembly is in the retracted position.

5. The system of claim 3 wherein the tow cable is attached to the elongate support member by a tow cable fastener that can be moved forward and back on the elongate support member to adjust flight attitude of the receiver coil assembly.

6. The system of claim 2 wherein the tubular side frame members are longer than the front and back tubular frame members, and vertical stabilizing fins are positioned near a back end, relative to a flight direction, of the receiver coil frame to assist in keeping the receiver coil assembly oriented in a consistent direction when suspended during flight with the receiver coil in a nominally horizontal orientation with its axis vertically oriented, the back tubular frame member having a flat wing-like configuration.

7. The system of claim 2 wherein the tubular side frame members and the tubular front and back frame members are each formed from upper and lower portions that can be separated from each other to expose the internal passageway.

8. The system of claim 1 comprising signal processing equipment for receiving signals from the receiver coil that are representative of EM fields generated in response to naturally occurring electrical events.

9. The system of claim 1 wherein the receiver coil is elastically suspended within the internal passageway.

10. The system of claim 9 wherein the receiver coil is supported within an inner frame section that is elastically suspended within the internal passageway.

11. The system of claim 10 wherein elastic members extend from an inner wall of the tubular receiver coil frame to the inner frame section.

12. The system of claim 11 wherein the elastic members are arranged to apply opposing forces on the inner frame section to centrally bias the inner frame section within the internal passageway.

13. The system of claim 1 wherein the receiver coil has a minimum diameter of between 3 and 8 meters.

14. An airborne geophysical electromagnetic (EM) survey system comprising:
- a fixed wing aircraft;
- a receiver coil assembly comprising a substantially rigid tubular receiver coil frame forming a central open area and a continuous internal passageway that extends around the central open area through which air can pass through the receiver coil frame, a receiver coil housed within the internal passageway, and an elongate support member extending across the central open area between spaced apart locations of the receiver coil frame;
- a winch system mounted to the fixed wing aircraft, the winch system having a tow cable secured to the receiver coil assembly and being configured to extend the tow cable to suspend the receiver coil assembly from the fixed wing aircraft with the receiver coil in a nominally horizontal orientation during a survey and to retract the tow cable to draw the receiver coil assembly into a retracted position at the underside of the fixed wing aircraft during takeoff and landing;
- a latch system mounted to an underside of the aircraft having releasable latch members for engaging the elongate support member when the receiver coil assembly is in the retracted position; and
- signal processing equipment in communication with the receiver coil for receiving signals therefrom representative of EM fields generated by a surveyed terrain in response to naturally occurring electrical events.

15. The system of claim 14 wherein the receiver coil frame is formed by a pair of spaced apart parallel tubular side frame members interconnected at a front end thereof by a front tubular frame member and interconnected at a back end thereof by a back tubular frame member.

16. The system of claim 15 wherein the elongate support member extends across the central open area from the front tubular frame member to the back tubular frame member, wherein the tow cable is attached to the elongate support member.

17. The system of claim 16 wherein the latch members includes a first pair and a second pair of opposed latch arms for releasably latching the elongate support member to engage the receiver coil assembly when the receiver coil assembly is in the retracted position.

18. The system of claim 17 wherein the receiver coil has a minimum diameter of 3 meters.

19. A method for conducting an airborne geophysical survey using a fixed wing aircraft, comprising:
- providing a receiver coil assembly comprising a substantially rigid tubular receiver coil frame forming a central open area and a continuous internal passageway that extends around the central open area through which air can pass through the receiver coil frame, and a receiver coil housed within the internal passageway;
- providing on the fixed wing aircraft a winch system having a tow cable secured to the receiver coil assembly and being configured to extend the tow cable to suspend the receiver coil assembly from the fixed wing aircraft and to retract the tow cable to draw the receiver coil assembly into a retracted position at the underside of the fixed wing aircraft during takeoff and landing;
- providing on an underside of the fixed wing aircraft a latch system having releasable latch members to engage the elongate support member when the receiver coil assembly is in the retracted position; and
- extending the tow cable during flight of the fixed wing aircraft to suspend the receiver coil frame in a nominally horizontal position and receiving signals from the receiver coil.

20. The method of claim 19 wherein the signals are representative of magnetic fields generated by a surveyed terrain in response to naturally occurring electrical events.

* * * * *